Dec. 27, 1966  F. L. WIER  3,294,203
BRAKE ACTUATING MECHANISM WITH AUTOMATIC ADJUSTMENT
Filed Jan. 21, 1965  3 Sheets-Sheet 1

INVENTOR.
Francis L. Wier
BY
McGrew & Edwards
ATTORNEYS

Dec. 27, 1966    F. L. WIER    3,294,203
BRAKE ACTUATING MECHANISM WITH AUTOMATIC ADJUSTMENT
Filed Jan. 21, 1965    3 Sheets-Sheet 2

INVENTOR.
Francis L. Wier
BY
ATTORNEYS

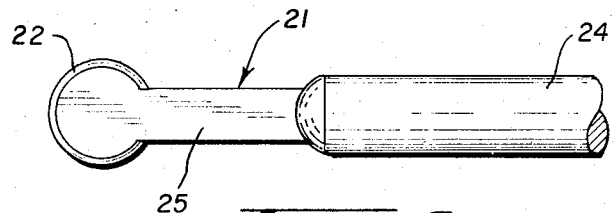
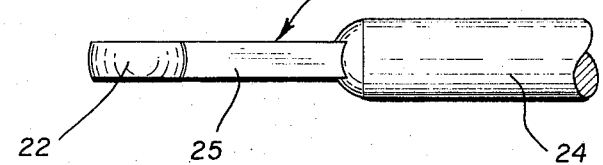
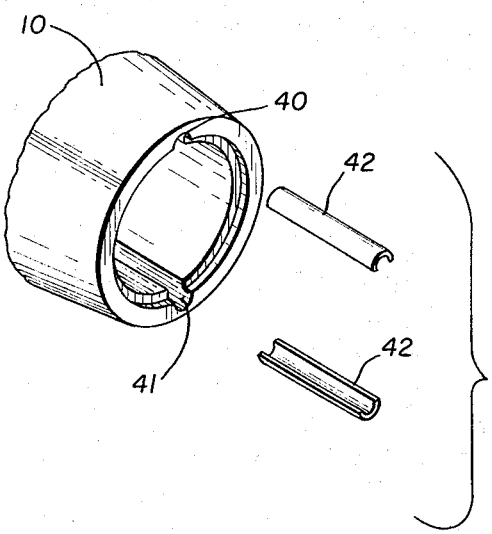
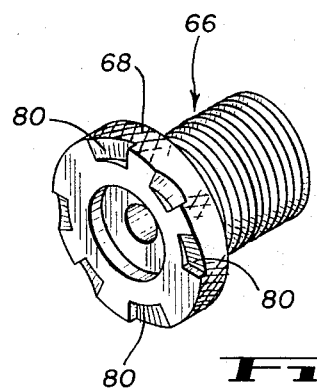

United States Patent Office 3,294,203
Patented Dec. 27, 1966

3,294,203
BRAKE ACTUATING MECHANISM WITH
AUTOMATIC ADJUSTMENT
Francis L. Wier, Englewood, Colo., assignor to The
American Coleman Company, Littleton, Colo., a corporation of Nebraska
Filed Jan. 21, 1965, Ser. No. 426,924
4 Claims. (Cl. 188—79.5)

This invention relates to improvements in brake actuating mechanism and more particularly it relates to improvements in cam actuated brake actuating mechanism and to automatic brake adjustment means incorporated therewith.

Included among the objects and advantages of the present invention is a brake actuating mechanism utilizing coacting cam surfaces to translate a substantially straight line actuating motion into a rotary motion actuating a cam and then to a straight line motion which is 90° to the first motion for moving brake shoes toward and away from a brake drum.

Another object of the invention is to provide automatic adjustment means which has a take-up in the brake mechanism when the straight line action required to achieve braking action moves more than a predetermined amount.

Another object of the invention is to provide a spring assisted plunger and spring biased brake shoes to provide positive shoe return from full braking position.

A further object of the invention is to provide a connection between an actuating plunger and a brake actuating member to prevent brake lockup.

These and other objects and advantages of the invention may be readily ascertained by referring to the following description and appended illustrations in which:

FIG. 6 is an enlarged detail view of an actuating plunger for movement of the primary cam of the brake mechanism according to the invention;

FIG. 7 is a side elevation of the plunger of FIG. 6;

FIG. 8 is an exploded detail of anti-rotary key locks for the secondary cam of the brake actuating mechanism; and FIG. 9 is an enlarged perspective view of an adjusting screw according to the invention.

In general, the device of the invention translates straight line motion from a connecting rod into a rotary motion. For example, the connecting rod might be attached to the piston or plunger on a hydraulic cylinder, an air cylinder or the like. This rotary motion is translated into a straight line motion which is 90° to the first motion so as to move the brake shoes. To translate the first straight line motion, the plunger is connected to a sleeve-type cam and the linear movement of the plunger rotates the sleeve. The sleeve is a primary cam which on rotation moves a secondary cam in a straight line axially toward and away from the primary cam. Brake shoes connected to the secondary cam will likewise move toward and away from the primary cam.

As in conventional installations, one end of each brake shoe is pivoted and the other ends of the brake shoes are moved toward and away from each other to force the shoes against the brake drum and pull them away from the drum. In a like manner, by connecting one end of the brake shoes to the cam arrangement of the invention, the brake shoes are caused to expand against the brake drum thereby providing a frictional contact for braking action. The primary and secondary cams of the invention are mounted in a housing which permits free rotation of the primary cam but prevents rotation of the secondary cam; a biased surface on the end of the primary cam rotates against a bias surface on the secondary cam causing the secondary cam to move axially in relation to the primary cam.

Figure 3:
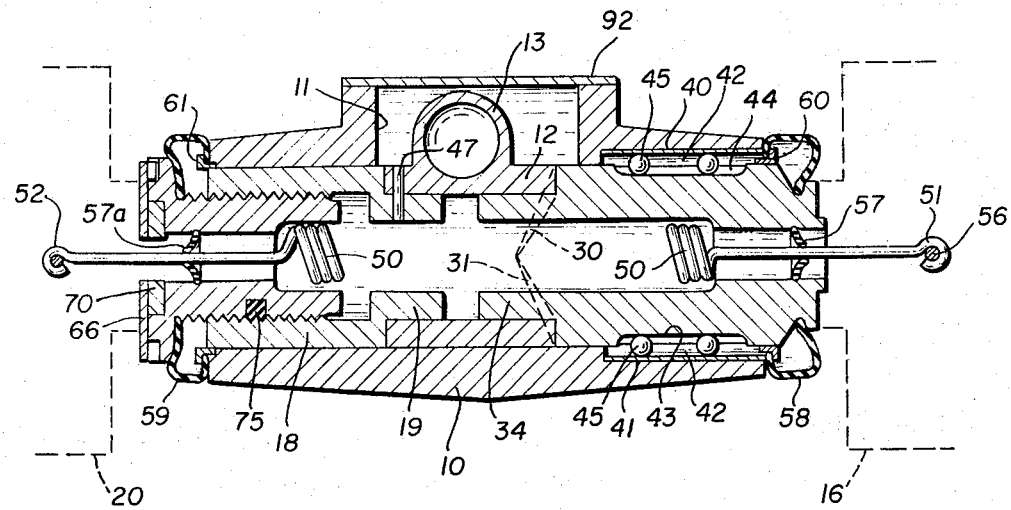
FIG. 3 is a cross-sectional, enlarged detail view of the brake actuating mechanism according to the invention in assembled position.

The major portions of the actual brake actuating mechanism include a housing 10, which is hollow and provides means for rotatably housing a primary cam 12, and a secondary cam 14. The secondary cam is likewise tubular and it is arranged to be attached to a brake shoe 16, shown in dash lines in FIG. 3. A plunger 18 is mounted on and for rotation with the opposite side of the primary cam 12 and it is arranged to be attached to a brake shoe 20. The housing 10 is provided with a lateral opening 11 which is somewhat elongated to permit the primary cam to center itself between the two brake shoes; in other words, the primary cam is arranged to center automatically as the brake shoes are forced against the brake drum. The primary cam 12 includes an upper extending boss 13 which has an internal spherical void 15 communicating with an elongated opening 17. This arrangement permits a tie rod 21 (FIGS. 6 and 7) having a circular member 22 on the end thereof to be inserted vertically into the elongated slot 17 and, on turning the tie rod a quarter of a turn either right or left, it is secured in the cam. This permits the plunger to be freely mounted in the cam and provides a positive push-pull action on the cam. In one form, the plunger includes a circular shaft 24 with a necked-down shank 25 supporting the spherical member 22. The spherical member has side flats 26 to permit it to enter opening 13. The rod 24 is arranged to be attached by a swivel to an actuating mechanism as explained below.

Figures 4, 5:
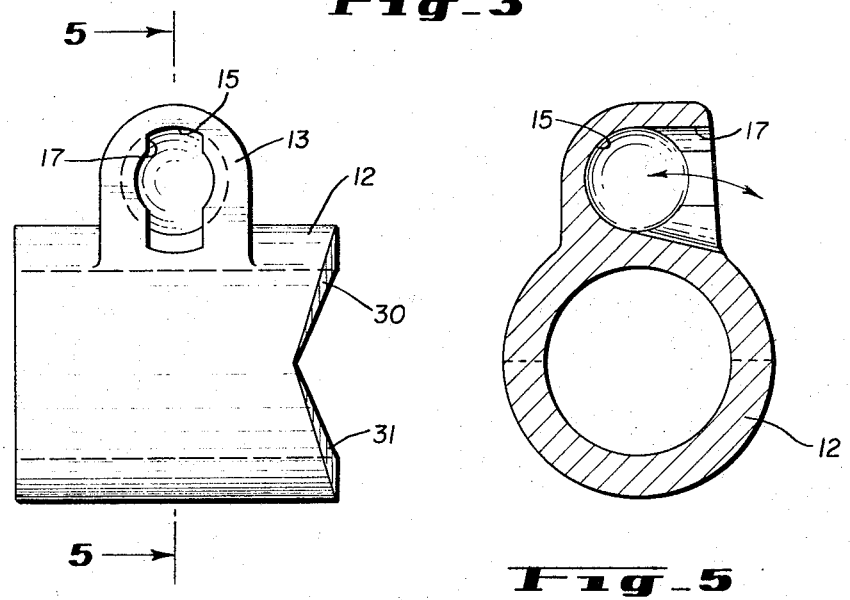
FIG. 4 is a side elevational view, in enlarged detail, of the primary cam of the brake actuating mechanism of the invention.
FIG. 5 is a cross-sectional view of the primary cam of FIG. 4 taken along section line 5—5.

The cam 12 includes double biased upper and lower surfaces 30 and 31 (FIGS. 4 and 5). The secondary cam or cam follower 14 includes surfaces mating with the biased cam surfaces 30 and 31 and which coact with these primary cam surfaces which extend around the end of the wall of the primary cam. A pilot sleeve 34 extending axially from the secondary cam is arranged to telescope into the primary cam to guide the primary cam during its operation. The pilot sleeve is of such a length as to permit the two cams to move to their full extended apart position and still provide a guide for the primary cam. The plunger 18 likewise includes a pilot sleeve 19 telescoped in the primary cam; a pin 47 secures the two parts together.

Two methods are shown to prevent the secondary cam from turning. In a first, the housing has opposed half-circular keyways 40 and 41, shown in FIG. 8. Into these fit half-circular wear guides 42. The wear guides and opposed semicircular keyways 43 and 44 in secondary cam support ball bearings 45 for free reciprocal action of the secondary cam. The balls permit the secondary cam to move axially in a straight line but not rotate in the housing 10.

Figure 2:
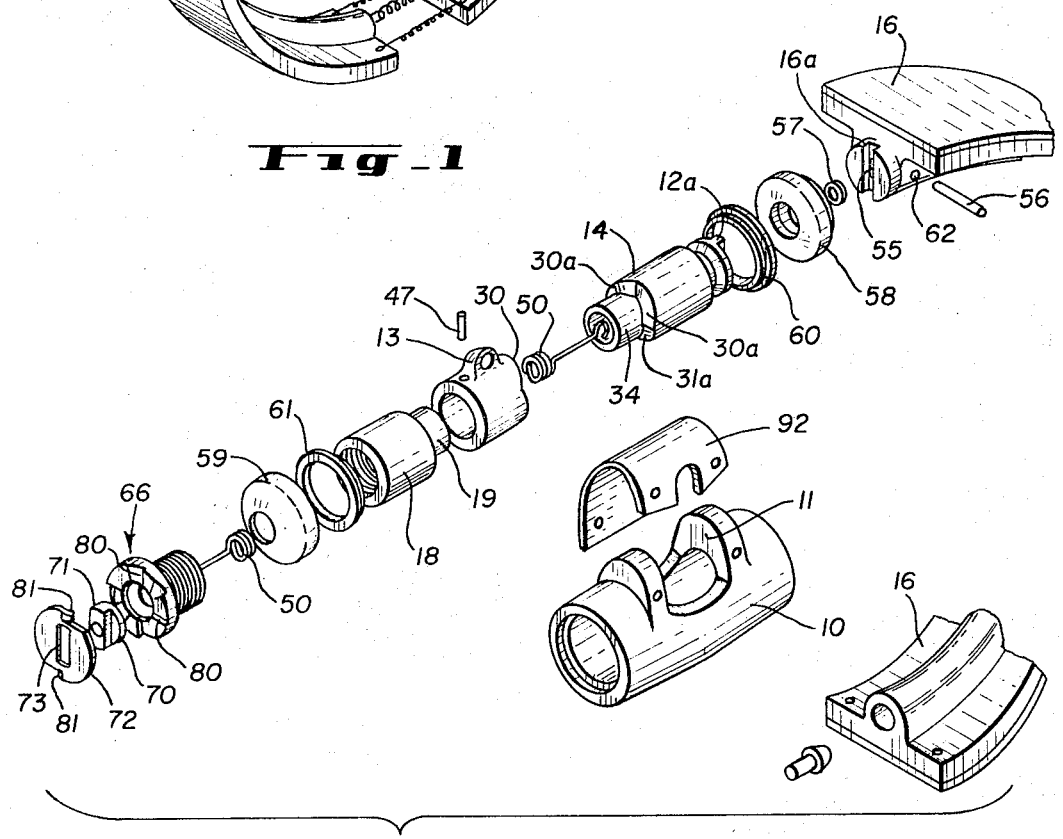
FIG. 2 is an exploded, enlarged detail view of the brake actuating mechanism illustrating the various parts of the mechanism.

The second method of preventing turning of the secondary cam is shown in FIG. 2, and it includes a key 12a on the end of the secondary cam which registers in keyway 16a in the end of the brake shoe. This arrangement is a simplified structure and provides for easy assembly. The key and keyway securely hold the secondary cam from turning.

A spring 50 (only a portion of which is shown but it is to be understood that the spring extends completely through the device) is provided with hooks 51 and 52 on opposite ends. These hooks are to be secured to the brake shoes, passing into an opening 55 in the brake shoe 16, for example, as shown in FIG. 2, and a pin 56 extending through a bore 57 in the shoe secures the spring to the brake shoe. The spring is arranged to hold the secondary cam firmly against the brake shoe and thereby holds the key in the keyway when used. In a similar manner, the hook 52 passes into an opening in the brake shoe 20 and a pin secures it in position. The spring biases the shoes away from the drum in open or non-braking position. A seal 57 mounted on one end of the spring and in the opening in the secondary cam prevents dirt and debris from entering the opening. A similar seal 57a is mounted on the opposite end of the spring, closing the opening in the adjusting screw. A rotary seal 58 mounted on the end of the housing by seal retainer 60 seals against the secondary cam and permits the secondary cam to extend and retract while remaining sealed. In a similar manner, a seal 59 retained by retainer 61 at the opposite end permits rotary action and axial movement of the plunger and retains the seal.

The plunger 18 is fastened to the primary cam 13 by means of a pin 47, by a splined connection, or by any convenient fastening means to insure that the plunger rotates with the primary cam. The adjustment mechanism includes an adjusting screw shown generally by numeral 66 which is threadedly mounted in the plunger 18. The adjusting screw 66 (FIG. 9) has a knurled shoulder 68 providing means for primary adjustment when the device is assembled. An adapter 70 is mounted in the end of the adjusting screw 66, and a ratchet washer 72 with an elongated slot 73 is mounted on the elongated boss 71 of the adapter 70. The boss passes into the slot 73 and into an elongated slot in the brake shoe so that the washer will not turn. A nylon locking insert 75 in the adjusting screw permits the screw to rotate forwardly with the cam with more resistance than ratchet teeth. Since the adapter 70 is keyed into the opening in the brake shoe, or otherwise held so that it will not rotate, the ratches washer is held from rotating. The teeth 80 on the face of the adjusting screw 66 are arranged to mesh with the dogs 81 on the ratchet washer. The teeth are spaced apart a sufficient distance so that the cam and adjusting screw can be rotated sufficiently for full braking action when in correct adjustment without the dogs catching the next set of opposed teeth. As the brake bands wear, the cam must be rotated further to push the shoes slightly further to obtain full braking pressure. When the band wears enough, which, of course, is a very small fraction of an inch, the cam must be rotated far enough to engage the dogs in the next set of teeth, thereby catching the adjusting screw and adjusting and holding the distance the ends of the brake shoes are held apart during the return stroke. When the braking cam is released, the adjusting screw will not back up but will thread out as the primary cam is returned by spring pressure so that there is an automatic takeup in the adjusting screw. The dogs will ride between sets of teeth until the brake bands wear enough that the actuating mechanism has to be moved a sufficient distance for the ratchet dog to fall behind the next tooth set. Thus, an automatic adjustment is achieved by actually operating the brake mechanism itself.

Figure 1:
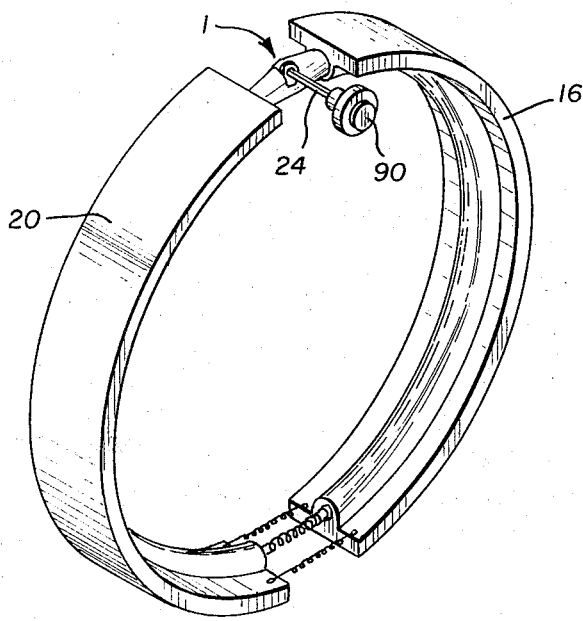
FIG. 1 is a perspective, generally schematic, view of a brake actuating system mounted on brake shoes.

The overall assembly is shown in FIG. 1 where the brake shoes 16 and 20 are secured together at their bottoms in a brake drum by conventional pivoted means (not shown), and the top of the brake shoes are secured together by the means of the cam mechanism 1. The plunger 24 is attached to an air cylinder 90 which is controlled by the brake pedal in the cab. The air cylinder moves the rod toward and away from the cam mechanism and thereby rotates the primary cam. The primary cam moves the secondary cam toward and away from the primary cam. The primary cam is free to "float" in the housing and automatically centers between the two brake shoes so that uniform pressure is applied outwardly by the cams on both of the shoes against the brake drum. This produces equal pressure on the two brake shoes and equal wear on the linings on the brake shoes. A cover 92 encloses the opening to the housing but permits the rod to extend through it for operating the primary cam. The spring 50 being secured to the upper end of both brake shoes provides a positive release force, so when the plunger 24 is released the spring bias draws the shoes together, positively releasing braking pressure.

It is necessary that some means, preferably a spring, is used in conjunction with the actuating cylinder to return the plunger and the attached primary cam and cause brake adjustment. The primary plunger must also be capable of swiveling in its attachment with the cylinder end since the primary cam moves laterally in centering. The plunger must, also, by operation, vibration or the like, be prevented from rotating. A simple means is to provide a screw in the housing mating with one of the flat surfaces on the plunger.

While the invention has been illustrated by reference to a particular embodiment, there is no intent to limit the spirit or scope of the invention to the precise details so set forth, except as defined in the following claims.

I claim:

1. Brake actuating mechanism comprising a hollow, tubular housing arranged between the adjacent ends of a pair of brake shoes, said housing having a generally central lateral opening; a cylindrical cam member mounted in said housing for rotation and limited axial reciprocation, said cylindrical cam member having a passage therethrough and a cam surface biased to a radial plane on one end thereof; a non-rotatable cylindrical cam follower having a passage therein reciprocably mounted in said housing secured against rotation and having a mating cam surface on one end contacting said cam surface on said cylindrical cam member; means connecting said cam follower to the end of one of said brake shoes, means connecting the opposite end of said cam member to the end of the other said brake shoe; spring means extending through said passage in said cam and into said passage in said cam follower connecting the ends of said brake shoes together biasing them toward each other; and an arm arranged for a swivel connection to push-pull means mounted through said lateral opening and connected with said cam member for rotating said cam member and moving said cam follower toward and away from said cam member to thereby move said brake shoe ends toward and away from each other.

2. An automatic slack adjustment for a brake actuating mechanism having a rotary member mounted between the ends of a pair of brake shoes, which rotary member is rotated during braking action in moving the ends of said shoes apart, comprising an adjusting screw threadedly mounted in an end of said rotary member and arranged to vary the distance between the ends of the brake shoes; stop means between said adjusting screw and said rotary member to permit one-way rotation for extending said adjusting screw from said rotary member ratchet means mounted on and arranged to rotate with said adjusting screw inclusive of a plurality of ratchet teeth; at least one dog means arranged with the end of the adjacent brake shoe and mounted in engagement with said ratchet and arranged to be non-rotating against rotation of said adjusting screw and ratchet; and means maintaining said at least one dog means against said ratchet whereby rotation of said rotary member rotates said adjusting screw outwardly and said adjusting screw is prevented from inward rotation by said stop means to maintain a predetermined spacing between said brake shoe ends to compensate for wear.

3. An automatic slack adjustment according to claim 2 wherein said stop means is a nylon locking insert embedded in said adjusting screw and contacting the threads in said body.

4. An automatic slack adjustment according to claim 2 wherein said at least one dog means is a slotted washer mounted against rotation on the adjacent brake shoe end and has opposed dogs for engaging opposed teeth on said ratchet.

References Cited by the Examiner

UNITED STATES PATENTS

| 1,669,965 | 5/1928 | Bastien. |
| 3,232,392 | 2/1966 | Mossey 188—79.5 X |

FOREIGN PATENTS

| 437,143 | 11/1926 | Germany. |
| 203,019 | 9/1923 | Great Britain. |

DUANE A. REGER, *Primary Examiner.*